United States Patent

Takenobu et al.

(10) Patent No.: US 8,953,925 B2
(45) Date of Patent: Feb. 10, 2015

(54) OPTICAL WAVEGUIDE

(75) Inventors: Shotaro Takenobu, Tokyo (JP); Takeshi Eriguchi, Tokyo (JP); Shunsuke Yokotsuka, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 817 days.

(21) Appl. No.: 13/234,768

(22) Filed: Sep. 16, 2011

(65) Prior Publication Data

US 2012/0002932 A1    Jan. 5, 2012

Related U.S. Application Data

(63) Continuation-in-part of application No. PCT/JP2010/054370, filed on Mar. 15, 2010.

(30) Foreign Application Priority Data

Mar. 18, 2009  (JP) ................................. 2009-066720

(51) Int. Cl.
| | | |
|---|---|---|
| *G02B 6/00* | (2006.01) | |
| *G02B 6/138* | (2006.01) | |
| *C08G 65/40* | (2006.01) | |
| *G02B 6/122* | (2006.01) | |
| *C08L 71/00* | (2006.01) | |

(52) U.S. Cl.
CPC ............ *G02B 6/138* (2013.01); *C08G 65/4006* (2013.01); *G02B 6/1221* (2013.01); *C08L 71/00* (2013.01); *C08L 2205/05* (2013.01)
USPC .......................................... 385/145; 385/130

(58) Field of Classification Search
USPC ................................................. 385/130, 145
See application file for complete search history.

(56) References Cited

U.S. PATENT DOCUMENTS

| | | | |
|---|---|---|---|
| 6,881,811 B2 | 4/2005 | Yokotsuka et al. | |
| 7,538,177 B2 | 5/2009 | Eriguchi et al. | |
| 7,892,720 B2 | 2/2011 | Eriguchi et al. | |
| 8,168,742 B2 | 5/2012 | Yokotsuka et al. | |
| 8,538,230 B2* | 9/2013 | Ochiai et al. ................... | 385/145 |
| 2006/0067638 A1 | 3/2006 | Change et al. | |
| 2006/0173129 A1 | 8/2006 | Yokotsuka et al. | |
| 2009/0081376 A1 | 3/2009 | Ito et al. | |
| 2010/0144914 A1 | 6/2010 | Yokotsuka et al. | |

FOREIGN PATENT DOCUMENTS

| | | |
|---|---|---|
| CN | 1681881 A | 10/2005 |
| JP | 2005-105115 | 4/2005 |
| WO | WO 03/072625 A1 | 9/2003 |

OTHER PUBLICATIONS

Joo-Heon Ahn et al., "Polymeric 1×16 Arrayed Waveguide Grating Multiplexer Using Fluorinated Poly(Arylene Ethers) at 1550 nm", IEICE Trans. Commun., vol. E82-B, No. 2, Feb. 1999, pp. 406-408.

* cited by examiner

*Primary Examiner* — Eric Wong
(74) *Attorney, Agent, or Firm* — Oblon, Spivak, McClelland, Maier & Neustadt, L.L.P.

(57) ABSTRACT

The present invention relates to an optical waveguide containing: a core formed by curing (A) a fluorine-containing polyarylene prepolymer having a crosslinkable functional group; and a cladding formed by curing (I) a curable composition containing (B) a compound having a molecular weight of 140 to 5,000, having a crosslinkable functional group and having no fluorine atom, and (A) a fluorine-containing polyarylene prepolymer.

8 Claims, 2 Drawing Sheets

OPTICAL WAVEGUIDE

TECHNICAL FIELD

The present invention relates to an optical waveguide.

BACKGROUND ART

For example, in the field of communication equipment, with the reduction in device size and the speeding up of communication, it is attracting attention to use a resin-made optical waveguide for signal transmission.

In Patent Document 1, a polyarylene resin having high transparency and low-dielectric constant is proposed as an embedding material for use in forming individual pixels in the process of producing TFT (thin-film transistor), and in Patent Document 2, a negative photosensitive resin composition obtained by imparting photosensitivity to a polyarylene resin is proposed, but there is not known a case of using such a resin for an optical waveguide.

PRIOR ART DOCUMENT

Patent Document

Patent Document 1: WO 2006/137327
Patent Document 2: WO 2007/119384

SUMMARY OF THE INVENTION

Problems that the Invention is to Solve

A resin-made optical waveguide is likely to have a problem in the thermal resistance. Also, heating, bending or changing temperature may cause separation, crack and the like at the interface between a core and a cladding, and it is demanded to successfully prevent these occurrences.

Under these circumstances, the present invention has been made, and an object of the present invention is to provide an optical waveguide which is made of a resin material and exhibits good thermal resistance and excellent contact between a core and a cladding.

Means for Solving the Problems

In order to solve the above problems, the optical waveguide of the present invention comprises:

a core formed by curing (A) a fluorine-containing polyarylene prepolymer having a crosslinkable functional group; and a cladding formed by curing (I) a curable composition containing (B) a compound having a molecular weight of 140 to 5,000, having a crosslinkable functional group and having no fluorine atom, and (A) a fluorine-containing polyarylene prepolymer.

In the curable composition (I), the ratio of the fluorine-containing polyarylene prepolymer (A) to the total mass of the fluorine-containing polyarylene prepolymer (A) and the compound (B) is preferably from 1 to 97 mass %

The compound (B) preferably has two or more of crosslinkable functional groups.

The crosslinkable functional group in the compound (B) preferably contains one or more members selected from the group consisting of a vinyl group, an allyl group, an ethynyl group, a vinyloxy group, an allyloxy group, an acryloyl group, an acryloyloxy group, a methacryloyl group and a methacryloyloxy group.

The optical waveguide is preferably in a film form.

Effects of the Invention

According to the present invention, an optical waveguide, which is made of a resin material and exhibiting good thermal resistance and excellent contact between a core and a cladding, is obtained.

BRIEF DESCRIPTION OF THE DRAWINGS

FIG. 2($a$) to FIG. 2($c$) are cross-sectional views illustrating an example of the production method for the optical waveguide of the present invention in the order of steps.

MODE FOR CARRYING OUT THE INVENTION

In the description of the present invention, the JPCA Standard means "Test Method for Polymer Optical Waveguide; JPCA-PE02-05-01S-2008" (published by the Japan Electronics Packaging and Circuits Association).

<Optical Waveguide>

Figure 1:
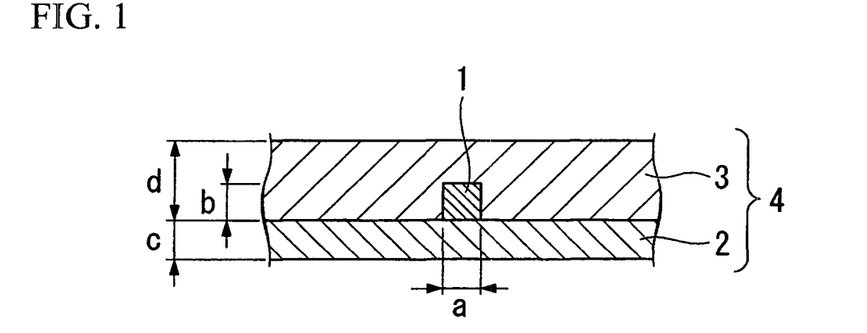
FIG. 1 is a cross-sectional view showing one embodiment of the optical waveguide of the present invention.

FIG. 1 shows one embodiment of the optical waveguide of the present invention and is a cross-sectional view perpendicular to the length direction of the core. In the Figure, numeral 1 is the core and 4 is the cladding. The optical waveguide of this embodiment is in a film form where the thickness (c+d) of the cladding 4 is approximately from 20 to 200 μm.

In this embodiment, the cross-sectional profile of the core 1 is rectangular, but not limited thereto and may be, for example, a trapezoidal, circular or elliptical. In the case where the cross-sectional profile of the core 1 is polygonal, the corners may be rounded.

The surround of the core 1 is surrounded by the cladding 4. The cladding 4 contains a lowercladding 2 and an uppercladding 3. The refractive index of the core 1 is higher than the refractive index of the cladding 4. That is, the refractive index of the core 1 is higher than both the refractive index of the lowercladding 2 and the refractive index of the uppercladding 3. The lowercladding 2 and the uppercladding 3 may be formed of the same material or different materials.

The shape and size of the core 1 are not particularly limited and may be appropriately designed by taking into consideration, for example, the coupling efficiency with a light source or a light receiving element. The coupling efficiency depends on the core diameter and the numerical aperture (NA). For example, each of the width a and the height b of the core 1 is preferably on the order of 10 to 100 μm. If they are less than 10 μm, the coupling efficiency with a light source or a light receiving element is liable to decrease. On the other hand, when envisaging bending, for example, to a bend radius (R)=about 1 mm, from the standpoint of reducing the bending loss, the width a and the height b of the core 1 are preferably 100 μm or less. Furthermore, the size (width and height) of the light receiving part of a photodiode (PD) used as the light receiving element is usually 100 μm or less, and also in this viewpoint, the width a and the height b of the core 1 are preferably 100 μm or less. The bending loss can be measured by using the method described in the JPCA Standard, 4.6.4. Specifically, the measurement is performed in accordance with b) Measurement 2 under the bending radius of 1 mm. Here, bending is performed by selecting a bending angle of 360°, and employing Bending Method 1 in the JPCA Standard above, FIG. 4. 6. 4-1 Measurement 1.

The thickness c of the lowercladding 2 and the thickness d of the uppercladding 3 are designed to reduce the light loss according to the value of the numerical aperture (NA). Light can be transmitted even in a configuration where either one or both of the lowercladding 2 and the uppercladding 3 are not provided and the core 1 is contacted with an air space, but the lowercladding 2 and the uppercladding 3 are preferably provided.

In view of protection of the core 1, the thickness c of the lowercladding 2 is preferably from 5 to 50 µm. In view of the protection, the thickness d of the uppercladding 3 is preferably from 15 to 150 µm.

<Fluorine-Containing Polyarylene Prepolymer (A)>

The core 1 is formed by curing (A) a fluorine-containing polyarylene prepolymer having a crosslinkable functional group (hereinafter, sometimes simply referred to as a prepolymer (A)).

Also in (I) a curable composition used for the formation of the cladding 4, (A) a prepolymer is contained. The prepolymer (A) used for the formation of the core 1 and the prepolymer (A) used for the formation of the cladding 4 may be the same or different. In view of adhesion, contact, prevention of crack, and reduction in the expansion rate difference, these prepolymers are preferably the same.

The prepolymer (A) has a polyarylene structure where a plurality of aromatic rings are combined through a single bond or a linking group, has a fluorine atom and has a crosslinkable functional group.

Examples of the linking group in the polyarylene structure include an ether bond (—O—), a sulfide bond (—S—), a carbonyl group (—CO—), and a divalent group (—$SO_2$—) formed by removing a hydroxyl group from a sulfonic acid group. Out of prepolymers (A), particularly, a prepolymer having a structure where aromatic rings are combined through a linking group containing an ether bond (—O—) is referred to as a fluorine-containing polyarylene ether prepolymer (A1). The prepolymer (A) in the present invention is a concept including the fluorine-containing polyarylene ether prepolymer (A1).

Specific examples of the linking group containing an ether bond include an ether bond (—O—) composed of only an ethereal oxygen atom, and an alkylene group containing an ethereal oxygen atom in a carbon chain.

The crosslinkable functional group of the prepolymer (A) is a reactive functional group causing substantially no reaction at the production of the prepolymer but when an external energy is applied, undergoing a reaction to bring about increase in the molecular weight through crosslinking or chain extension between prepolymer molecules.

Examples of the external energy include heat, light and electron beam. These external energies may be used in combination.

In the case of using heat as the external energy, a reactive functional group causing a reaction at a reaction temperature of 40° C. to 500° C. is preferred. If the reaction temperature is too low, stability during storage of the prepolymer or a composition containing the prepolymer cannot be ensured, whereas if it is excessively high, thermal decomposition of the prepolymer itself occurs at the reaction. For this reason, the reaction temperature is preferably in the range above. The reaction temperature is more preferably from 60° C. to 300° C., still more preferably from 70° C. to 200° C., and yet still more preferably from 120° C. to 250° C.

In the case of using light (actinic ray) as the external energy, exposure to light is preferably performed in a state of the prepolymer (A) and a photosensitizer being present together. Specifically, it is preferred to prepare a coating solution (curable composition) containing the prepolymer (A) and to incorporate a photosensitizer thereinto. In the exposure step, when an actinic ray is selectively irradiated only on the desired portion, the molecular weight can be increased only in the exposed area and the unexposed portion can be removed by dissolving it with a developer. If desired, after the exposure and development, an external energy such as actinic ray or heat may be also applied to more increase the molecular weight.

Specific examples of the crosslinkable functional group include a vinyl group, an allyl group, an allyloxy group, a methacryloyl(oxy) group, an acryloyl(oxy) group, a vinyloxy group, a trifluorovinyl group, a trifluorovinyloxy group, an ethynyl group, a 1-oxocyclopenta-2,5-dien-3-yl group, a cyano group, an alkoxysilyl group, a diarylhydroxymethyl group, a hydroxyfluorenyl group, a cyclobutarene ring and an oxirane ring. A vinyl group, a methacryloyl(oxy) group, an acryloyl(oxy) group, a trifluorovinyloxy group, an ethynyl group, a cyclobutarene ring and an oxirane ring are preferred in view of high reactivity and capable of achieving high crosslinking density, and a vinyl group and an ethynyl group are most preferred in view of capable of achieving good thermal resistance after increase in the molecular weight.

Incidentally, the "methacryloyl(oxy) group" means a methacryloyl group or a methacryloyloxy group, and the same applies to an acryloyl(oxy) group.

The prepolymer (A) has an aromatic ring and therefore, exhibits good thermal resistance.

Among the prepolymers (A), (A1) a fluorine-containing polyarylene ether prepolymer is particularly preferred because by virtue of having an ethereal oxygen atom, the molecular structure is flexible and the cured product exhibits good flexibility.

The prepolymer (A) has a fluorine atom. That is, the prepolymer (A) has a C—F bond formed by substituting a fluorine atom for the hydrogen atom of a C—H bond and in turn, the proportion of C—H bonds is reduced. The C—H bond has absorption in the optical communication wavelength band (1,250 to 1,650 nm), and the prepolymer (A) having reduced C—H bonds is allowed to little absorb the light in the optical communication wavelength band. Also, by virtue of having a fluorine atom, the prepolymer (A) is low in the water absorbability or hygroscopicity and not only has excellent resistance to high temperature and high humidity but also has high chemical stability. Accordingly, the optical waveguide using the prepolymer (A) exhibits stable characteristics with little fluctuation of the refractive index due to change in the external environment, particularly change in humidity, and ensures high transparency in the optical communication wavelength band.

The cured product of the prepolymer (A) has high transparency near the wavelength of 1,310 nm and therefore, an optical waveguide having good compatibility with the existing optical device can be obtained. That is, in an optical transmission device using a quartz-based optical fiber, a wavelength of 1,310 nm is generally used in many cases and a large number of optical devices such as light receiving element compatible with this used wavelength are produced. In this respect, the reliability is also high.

Preferred examples of the prepolymer (A) include a polymer obtained by reacting: a fluorine-containing aromatic compound such as perfluoro(1,3,5-triphenylbenzene) and perfluorobiphenyl; a phenolic compound such as 1,3,5-trihydroxybenzene and 1,1,1-tris(4-hydroxyphenyl)ethane; and a crosslinkable compound such as pentafluorostyrene, acetoxystyrene and chloromethylstyrene, in the presence of a dehydrohalogenation agent such as potassium carbonate.

As for the content of the crosslinkable functional group in the prepolymer (A) of the present invention, the crosslinkable functional group preferably accounts for 0.1 to 4 mmol, and more preferably from 0.2 to 3 mmol, per gram of the prepolymer. When the content is 0.1 mmol or more, the thermal resistance and solvent resistance of the cured product can be high, and when it is 4 mmol or less, the brittleness can be kept low and the dielectric constant can be prevented from increasing.

<Compound (B)>

The curable composition (I) for use in forming the cladding 4 contains the above-described prepolymer (A) and the compound (B). As for each of the prepolymer (A) and the compound (B), one member may be used, or two or more members may be used.

The compound (B) has a molecular weight of 140 to 5,000, has a crosslinkable functional group and has no fluorine atoms. Thanks to the absence of fluorine atom, good embedding flatness is readily obtained.

With good embedding flatness, the uppercladding 3 is likely to have a flat surface. Also, the cost tends to be low compared with a fluorine-containing compound.

When the molecular weight of the compound (B) is 5,000 or less, the viscosity of the compound (B) can be kept low, and a uniform composition is likely to be obtained when mixed with the prepolymer (A). Also, good flatness is readily obtained.

When the molecular weight of the compound (B) is 140 or more, good thermal resistance is obtained and decomposition or evaporation due to heating hardly occurs. The range of molecular weight of the compound (B) is preferably from 250 to 3,000, and more preferably from 250 to 2,500.

The crosslinkable functional group of the compound (B) is preferably a reactive functional group containing no fluorine atom and undergoing a reaction in the same step as the step of reacting the crosslinkable functional group of the prepolymer (A).

The crosslinkable functional group of the compound (B) causes crosslinking or chain extension by reacting at least with the compound (B). The crosslinkable functional group of the compound (B) preferably reacts with both the prepolymer (A) and the compound (B) to cause crosslinking or chain extension.

The crosslinkable functional group of the compound (B) is preferably a double or triple bond between a carbon atom and a carbon atom. However, an aromatic double or triple bond is not included.

The double or triple bond as the crosslinkable functional group may be present inside the molecular chain or may be present at the terminal but is preferably present at the terminal, because the reactivity is high. In the case of a double bond, the compound may be an internal olefin or a terminal olefin but is preferably a terminal olefin. The expression "is present inside the molecular chain" includes a case where the bond is present in a part of an aliphatic ring, as in cycloolefins.

Specifically, it is preferred to contain one or more members selected from the group consisting of a vinyl group, an allyl group, an ethynyl group, a vinyloxy group, an allyloxy group, an acryloyl group, an acryloyloxy group, a methacryloyl group and a methacryloyloxy group. Among these, an acryloyl group and an acryloyloxy group are preferred because a reaction is caused by irradiation with light even in the absence of a photosensitizer.

The compound (B) preferably has two or more, more preferably from 2 to 20, and still more preferably from 2 to 8, of crosslinkable functional groups. When two or more of crosslinkable functional groups are contained, molecules can be crosslinked therebetween, so that thermal resistance of the cured film can be enhanced and the thickness reduction in the cured film due to heating can be successfully suppressed.

Specific examples of the compound (B) include dipentaerythritol triacrylate triundecylate, dipentaerythritol pentaacrylate monoundecylate, ethoxylated isocyanuric acid triacrylate, ε-caprolactone-modified tris-(2-acryloxyethyl) isocyanurate, dipentaerythritol polyacrylate, 9,9-bis[4-(2-acryloyloxyethoxy)phenyl]fluorene, polyethylene glycol diacrylate, polyethylene glycol dimethacrylate, polypropylene glycol diacrylate, polypropylene glycol dimethacrylate, ethoxylated bisphenol A diacrylate, ethoxylated bisphenol A dimethacrylate, propoxylated bisphenol A diacrylate, propoxylated bisphenol A dimethacrylate, 1,10-decanediol diacrylate, 1,6-hexanediol diacrylate, 1,6-hexanediol dimethacrylate, 1,4-butanediol dimethacrylate, 1,3-butanediol dimethacrylate, hydroxypivalic acid neopentyl glycol diacrylate, 1,9-nonanediol diacrylate, 1,9-nonanediol dimethacrylate, neopentyl glycol diacrylate, neopentyl glycol dimethacrylate, pentaerythritol triacrylate, trimethylolpropane triacrylate, ethoxylated trimethylolpropane triacrylate, propoxylated trimethylolpropane triacrylate, triallyl cyanurate, triallyl isocyanurate, trimethallyl isocyanurate, 1,4-butanediol divinyl ether, 1,9-nonanediol divinyl ether, cyclohexane dimethanol divinyl ether, triethylene glycol divinyl ether, trimethylol propane trivinyl ether, pentaerythritol tetravinyl ether, 2-(2-vinyloxyethoxy)ethyl acrylate, 2-(2-vinyloxyethoxy)ethyl methacrylate, trimethylolpropane diallyl ether, pentaerythritol triallyl ether, dipentaerythritol hexaacrylate, pentaerythritol tetraacrylate, an ethoxylated pentaerythritol tetraacrylate represented by the following formula (1), a propoxylated pentaerythritol tetraacrylate represented by the following formula (2), ditrimethylolpropane tetraacrylate, tricyclodecane dimethanol diacrylate, tricyclodecane dimethanol methacrylate, and a compound represented by the following formula (3). Furthermore, a polyester acrylate (a compound obtained by modifying both terminals of a condensate of a dihydric alcohol and a dibasic acid with an acrylic acid: Aronix (M-6100, M-6200, M-6250, M-6500), trade name, produced by Toagosei Co., Ltd.; or a compound obtained by modifying a hydroxy group terminal of a condensate of a polyhydric alcohol and a polybasic acid with an acrylic acid: Aronix (M-7100, M-7300K, M-8030, M-8060, M-8100, M-8530, M-8560, M-9050), trade name, produced by Toagosei Co., Ltd.) may be also used. These compounds are available as a commercial product.

Among these, polypropylene glycol dimethacrylate and 1,10-decanediol diacrylate are preferred, because the formability of the cured film is good.

[Chem. 1]

(wherein l + m + n + o is from 4 to 35).

-continued (2)

(wherein l + m + n + o is about 4).

(3)

The cured product of the curable composition (I) forms the cladding 4 and therefore, the refractive index of the cured product needs to be lower than the refractive index of the core 1. The refractive index of the cured product of the curable composition (I) can be adjusted depending on the kind of the compound (B) and the mixing ratio between the prepolymer (A) and the compound (B).

Out of the above-described examples of the compound (B), when the refractive index of the cured product obtained by curing a compound (B) alone is lower than the refractive index of the cured product obtained by curing the prepolymer (A) alone, the compound is blended with the prepolymer (A), whereby the refractive index of the cured product of the curable composition (I) can be set to be lower than that of the cured product of the prepolymer (A).

In the case of using a compound (B) whose cured product has a refractive index higher than that of the cured product obtained by curing the prepolymer (A) alone, a compound (B) whose cured product has a refractive index lower than that of the cured product obtained by curing the prepolymer (A) alone is used in combination, whereby the refractive index of the cladding 4 can be set to be lower than the refractive index of the core 1.

The curable composition (I) contains the compound (B) having a relatively low molecular weight and therefore, is likely to be a uniform composition, and a flat surface is readily obtained when curing the composition. Also, the compound (B) undergoes a crosslinking reaction and therefore, contributes to good thermal resistance.

The ratio of the prepolymer (A) to the total mass of the prepolymer (A) and the compound (B) contained in the curable composition (I) is preferably from 1 to 97 mass %, more preferably from 5 to 50 mass %, and still more preferably from 8 to 35 mass %.

As the content ratio of the prepolymer (A) is larger, higher thermal resistance is likely to be obtained, and as the content ratio of the compound (B) is larger, the cured product tends to have better surface flatness.

<Curable Composition (I)>

The curable composition (I) can be also prepared by dissolving the prepolymer (A) and the compound (B) in a solvent.

[Solvent]

As the solvent, a known one may be used. Specific examples thereof include propylene glycol monomethyl ether acetate (hereinafter, sometimes referred to as PGMEA), ethyl acetate, propyl acetate, isopropyl acetate, butyl acetate, pentyl acetate, isopentyl acetate, isobutyl isobutyrate, methyl-3-methoxypropionate, dipropylene glycol methyl ether acetate, cyclopentanone, methyl ethyl ketone, methyl isobutyl ketone, and dibutyl ketone.

[Thermal Cure Promoter]

In the case of thermal-curing the curable composition (I), a thermal cure promoter may be incorporated in the curable composition (I).

As the thermal cure promoter, a known one may be used. Specific examples thereof include azobisisobutyronitrile, benzoyl peroxide, tert-butyl hydroperoxide, cumene hydroperoxide, di-tert-butyl peroxide, and dicumyl peroxide.

[Photosensitizer]

In the case of photocuring the curable composition (I), a photosensitizer may be incorporated in the curable composition (I).

Specific examples of the photosensitizer include IRGACURE 907 (α-aminoalkylphenone-based), IRGACURE 369 (α-aminoalkylphenone-based), DAROCUR TPO (acylphosphine oxide-based), IRGACURE OXE01 (an oxime ester derivative), and IRGACURE OXE02 (an oxime ester derivative) (all produced by Ciba Specialty Chemicals). Among these, DAROCUR TPO, IRGACURE OXE01 and IRGACURE OXE02 are preferred.

[Adhesion Promoter]

An adhesion promoter such as silane coupling agent may be added to the curable composition (I). By the addition, the adhesion between a layer composed of the cured product of the curable composition (I) and a layer adjacent thereto can be enhanced.

<Production Method of Optical Waveguide>

Figure 2:
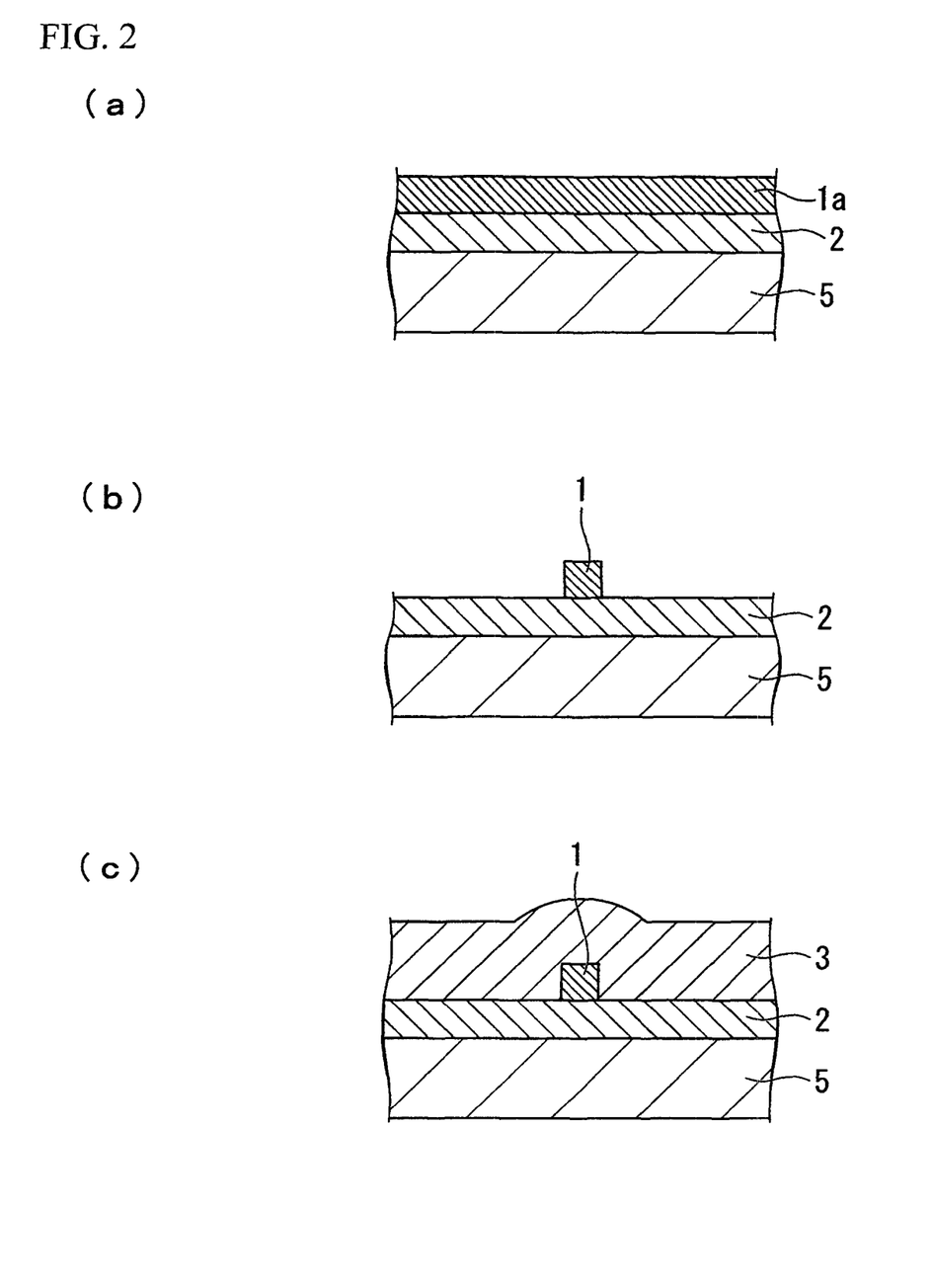

FIG. 2($a$) to FIG. 2($c$) illustrate an example of the production method for the optical waveguide of this embodiment in the order of steps. This example employs a method of forming the core 1 by photolithography. In FIG. 2($a$) to FIG. 2($c$), same numerals indicate the same constituent elements in FIG. 1 and description of the elements is omitted.

(1) Formation of Lowercladding

As shown in FIG. 2($a$), the curable composition (I) is coated on a substrate 5 and cured by heating and/or irradiation with light to form a lowercladding 2. Before coating the curable composition (I) on the substrate 5, an adhesion promoter (hereinafter, referred to as AP) may be coated on the substrate 5. Also, AP may be coated between respective layers of a lowercladding 2, a core 1 and an uppercladding 3.

The material for the substrate 5 is not particularly limited, but a material having good thermal resistance is preferred. Examples thereof include silicon and polyimide.

In the case where the optical waveguide is used in a state of the cladding 4 and the substrate 5 being integrated, an adhesion promoter is preferably added to the curable composition (I).

(2) Formation of Core

Next, as shown in FIG. 2($a$), a coating composition (II) containing the prepolymer (A) is coated on the lowercladding 2 and, if desired, pre-baked to form a coating film 1$a$. The pre-baking treatment is preferably performed at a temperature of 80 to 200° C., and more preferably at a temperature of 80 to 150° C., and is preferably performed for 10 seconds to 5 hours, and more preferably for 10 seconds to 10 minutes. For example, the pre-baking treatment is performed at 100° C. for 120 seconds or at 120° C. for 90 seconds.

Subsequently, as shown in FIG. 2(b), the coating film 1a is processed by photolithography to form a core 1. That is, the coating film 1a is irradiated with light (exposure) through a photomask and then developed, whereby the core 1 is formed. Thereafter, post-baking may be performed, if desired.

The coating solution (II) can be prepared by dissolving the prepolymer (A) in a solvent. The solvent is the same as that used for the curable composition (I). In this example, since the coating film 1a is processed by photolithography, a photosensitizer is preferably incorporated in the coating solution (II). Examples of the photosensitizer are the same as those described for the curable composition (I). Also, an adhesion promoter may be incorporated in the coating solution (II). Examples of the adhesion promoter are the same as those described for the curable composition (I).

Incidentally, the compound (B) may be incorporated in the coating solution (II), but in this case, the compound must be incorporated in a range where the refractive index of the cured product of the coating solution (II), that is, the refractive index of the core 1, becomes higher than the refractive index of the cured product of the curable composition (I), that is, the refractive index of the cladding 4. The refractive index difference between the core 1 and the cladding 4 is preferably in a range where the preferred numerical aperture (NA) described later is obtained.

(3) Formation of Uppercladding

Subsequently, as shown in FIG. 2(c), the curable composition (I) is coated on the lowercladding 2 and the core 1 and, in similar manner as in the lowercladding 2, cured by heating and/or irradiation with light to form an uppercladding 3, whereby an optical waveguide is obtained. The substrate 5 may be separated and removed, if desired.

According to this embodiment, the core 1 is formed of a cured product of the prepolymer (A), and each of the lowercladding 2 and the uppercladding 3 is formed of a cured product of the curable composition (I) containing the prepolymer (A) and the compound (B), so that good contact can be obtained at the interfaces of the core 1, lowercladding 2 and uppercladding 3.

Accordingly, the optical waveguide of this embodiment scarcely causes separation, crack or the like at the interface of the core with the cladding even when subjected to heating, bending, temperature change or the like.

Also, the cured product of the prepolymer (A) and the cured product of the curable composition (I) containing the prepolymer (A) are excellent in the thermal resistance and therefore, an optical waveguide with excellent thermal resistance is obtained.

EXAMPLES

The present invention is described in greater detail below by referring to Examples, but the present invention is not limited to these Examples.

Coating solutions used for forming the core and Curable compositions used for forming the cladding were prepared according to the formations shown in Table 1, and optical waveguides were produced by using these solutions and compositions as shown in Table 2.

Preparation Example 1

A fluorine-containing polyarylene ether prepolymer (A1-1) was prepared as follows.

That is, in an N,N-dimethylacetamide (hereinafter, referred to as DMAc) solvent (6.2 kg), perfluorobiphenyl (650 g) and 1,3,5-trihydroxybenzene (120 g) were reacted in the presence of potassium carbonate (570 g) at 40° C. for 6 hours and subsequently, 4-acetoxystyrene (200 g) was reacted in the presence of a 48 mass % potassium hydroxide aqueous solution (530 g) to synthesize a prepolymer. The obtained prepolymer in DMAc solution was poured in an aqueous hydrochloric acid solution (a 3.5 mass % aqueous solution), thereby performing purification by reprecipitation, and then vacuum-dried to obtain 800 g of a prepolymer (hereinafter, referred to as A1-1) in a powder form.

Preparation Example 2

Curable Composition (I-1) where the ratio of the prepolymer (A) to the total mass of the prepolymer (A) and the compound (B) (hereinafter, referred to as a ratio of (A)) is 30 mass % was prepared.

As the prepolymer (A), A1-1 obtained in Preparation Example 1 was used.

That is, 30 parts by mass of A1-1 and 70 parts by mass of 1,10-decanediol diacrylate (NK Ester A-DOD, product name, produced by Shin-Nakamura Chemical Co., Ltd., molecular weight: 282, hereinafter referred to as A-DOD) as the compound (B) were charged into a sample bottle, and the contents in the sample bottle were mixed at room temperature for 48 hours by using a mix rotor (MR-5, trade name, manufactured by AS ONE Corporation) to thereby obtain Curable Composition (I-1).

Preparation Example 3

In this Example, Curable Composition (I-2) where the ratio of (A) is 30 mass % was prepared using polypropylene glycol dimethacrylate (NK Ester 9PG, product name, produced by Shin-Nakamura Chemical Co., Ltd., molecular weight: 550, hereinafter referred to as 9PG) as the compound (B).

That is, 30 parts by mass of A1-1 and 70 parts by mass of 9PG were charged into a sample bottle, and the contents in the sample bottle were mixed at room temperature for 48 hours by using a mix rotor to thereby obtain Curable Composition (I-2).

Preparation Example 4

In this Example, Curable Composition (I-3) where the ratio of (A) is 10 mass % was prepared.

That is, 10 parts by mass of A1-1 and 90 parts by mass of 9PG were charged into a sample bottle, and the contents in the sample bottle were mixed at room temperature for 48 hours by using a mix rotor to thereby obtain Curable Composition (I-3).

Preparation Example 5

Coating Solution (II-1) used for forming the core was prepared.

A sample bottle was charged with 5.0 g of Prepolymer A1-1 obtained in Preparation Example 1, 0.3 g of IRGACURE OXE01 (product name, produced by Ciba Specialty Chemicals) as a photosensitizer, and 5.0 g of PGMEA as a solvent, and the contents in the sample bottle was mixed at room temperature for 48 hours by using a mix rotor to obtain Coating Solution (II-1).

Comparative Preparation Examples 1 and 2

Curable Compositions (I-4) and (I-5) not containing the prepolymer (A) were prepared. That is, Curable Compositions (I-4) and (I-5) were obtained in the same manner as in Preparation Examples 2 and 3, respectively, except for not using Prepolymer (A1) in Preparation Examples 2 and 3.

TABLE 1

|  |  | Formulation (A)/(B) | Ratio of (A) to Total of (A) and (B) |
|---|---|---|---|
| Preparation Example 2 | Curable Composition (I-1) | A1-1/A-DOD | 30 mass % |
| Preparation Example 3 | Curable Composition (I-2) | A1-1/9PG | 30 mass % |
| Preparation Example 4 | Curable Composition (I-3) | A1-1/9PG | 10 mass % |
| Preparation Example 5 | Coating Solution (II-1) | only A1-1 | 100 mass % |
| Comparative Preparation Example 1 | Curable Composition (I-4) | only A-DOD | 0 mass % |
| Comparative Preparation Example 2 | Curable Composition (I-5) | only 9PG | 0 mass % |

Example 1

An optical waveguide was produced by the method shown in FIG. 2. As the substrate 5, a silicon-made wafer was used.

First, Curable Composition (I-1) obtained in Preparation Example 2 was coated on a substrate 5 by spin coating and then heated at 190° C. for 2 hours to form a lowercladding 2 having a thickness c of 10 µm.

Next, Coating Solution (II-1) obtained in Preparation Example 5 was coated thereon and pre-baked at 100° C. for 120 seconds to form a coating film 1a having a thickness of 50 µm. The coating film 1a was exposed with light under the condition where the portion except for the portion which is to be the core 1 was protected from light with a metal foil. In the exposure, an ultrahigh-pressure mercury lamp (UL-7000, product name, manufactured by Quintel) was used, and the irradiation energy was set to 2,520 mJ/cm$^2$. Thereafter, development was performed using, as a developer, a mixed solution of PGMEA and ethyl lactate to remove the unexposed portion of the coating film 1 a. The film was then dried and further post-baked at 190° C. for 2 hours to form a core 1 having a width a of 50 µm and a height b of 50 µm.

Subsequently, Curable Composition (I-1) obtained in Preparation Example 2 was coated on the core 1 and the lowercladding 2 by spin coating and heated at 190° C. for 2 hours to thereby form an uppercladding 3 having a thickness d of 60 µm. The substrate 5 was separated at the interface with the lowercladding 2, whereby an optical waveguide in a film form was obtained.

Examples 2 and 3

Optical waveguides were produced in the same manner except that in Example 1, Curable Composition (I-2) obtained in Preparation Example 3 or Curable Composition (I-3) obtained in Preparation Example 4 was used in place of Curable Composition (I-1) used for forming the lowercladding 2 and the uppercladding 3.

Comparative Examples 1 and 2

Optical waveguides were produced in the same manner except that in Example 1, Curable Composition (I-4) obtained in Comparative Preparation Example 1 or Curable Composition (I-5) obtained in Comparative Preparation Example 2 was used in place of Curable Composition (I-1) used for forming the lowercladding 2 and the uppercladding 3.

In Comparative Examples 1 and 2, after forming the lowercladding 2 and the core 1, Curable Composition (I-4) or (I-5) was coated thereon by spin coating, as a result, the curable composition was repelled from the surface of the core 1 and could not be uniformly coated.

Furthermore, when heating at 190° C. for 2 hours was performed, there was a portion where the core 1 and the uppercladding 3 are not contacted at the interface to allow the uppercladding 3 to float, and the production was failed.

(Evaluation)

The optical waveguides obtained in Examples 1 to 3 were measured for the refractive indexes of the cores, the refractive indexes of the claddings, NA's and the insertion losses by the following methods. The results obtained are shown in Table 2.

[Refractive Index, NA]

The refractive indexes of the cores 1 and the refractive indexes of the claddings 4 in the obtained optical waveguides were measured and the numerical aperture (NA) was determined.

In the measurement of the refractive indexes, each of the core materials and the cladding materials was measured for the refractive index by a prism coupler method. The measurement wavelength was set to 1,310 nm, and the measurement temperature was set to 25° C.

Assuming that the refractive index of the core is n1 and the refractive index of the cladding is n2, the value of NA can be determined according to $\{(n1)^2-(n2)^2\}^{1/2}$. When envisaging that the optical waveguide is bent to a bend radius (R)=about 1 mm, NA is preferably 0.20 or more for successfully suppressing the bending loss.

The insertion loss is preferably from 0 to 200 dB, more preferably from 0 to 10 dB, and still more preferably from 0 to 5 dB.

[Insertion Loss]

The insertion loss was measured by the method described in the JPCA Standard, 4.6.1. As for the combination of the optical fiber on the incident side and the mode of the optical waveguide, a single mode fiber and a multimode fiber were used on the incident side and the outgoing side, respectively, which is the combination corresponding to Combination No. 4 described in the JPCA Standard, Table 4. 6. 1-1. As the fiber used at the measurement of insertion loss, a single mode fiber (part number: SMF 128, produced by Corning Inc., NA: 0.11, core diameter: 10 µm) and a multimode fiber (part number: GIF625HT, produced by Solabo, NA: 0.275, core diameter: 62.5 um, GI fiber) were used on the incident side and the outgoing side, respectively.

As for the light source on the light emission side used in the optical measurement system, unit of AQ2140 (product name) manufactured by Ando Electric Co., Ltd. with LD light source AQ4213 (product name, wavelength: 1,310 nm) was used. Also, as for the power meter on the light receiving side, Q8221 Unit (product name) manufactured by Advantest Corp. with sensor unit of Q82208 (product name) was used.

The measurement was performed in accordance with the above-described JPCA Standard, "4.6.1 Measurement Method of Insertion Loss, (3) Measurement".

TABLE 2

| | Curable Composition for Lower-cladding | Coating Solution for Core | Curable Composition for Upper-cladding | Refractive Index of Core | Refractive Index of Cladding | NA | Insertion Loss (dB) |
|---|---|---|---|---|---|---|---|
| Ex. 1 | I-1 | II-1 | I-1 | 1.534 | 1.503 | 0.31 | 3.0 |
| Ex. 2 | I-2 | II-1 | I-2 | 1.534 | 1.494 | 0.35 | 3.2 |
| Ex. 3 | I-3 | II-1 | I-3 | 1.534 | 1.480 | 0.41 | 3.8 |
| Comp. Ex. 1 | I-4 | II-1 | I-4 | — | | | |
| Comp. Ex. 2 | I-5 | II-1 | I-5 | — | | | |

The optical waveguides obtained in Examples 1 and 2 were measured for the bending strength by the following method. A film-shaped optical waveguide of 10 cm long was used as the test sample.

[Repeated Bending Test]

A repeated bending test was performed by the following method to evaluate whether the breakage of core or cladding or the generation of crack was observed or not.

The bending test was performed by folding the film-shaped optical waveguide at 0 to 180°.

In the evaluation, the presence or absence of breakage of core or cladding and the presence or absence of generation of crack were evaluated. Here, the presence or absence of breakage of core or cladding and the presence or absence of generation of crack were observed by appropriately using a differential interference microscope.

As a result, in Example 1, even when the optical waveguide was folded in a bend radius r=1 mm 2,760,000 times, breakage and crack were not generated. In Example 2, even when the optical waveguide was folded in a bend radius r=1 mm 2,760,000 times, breakage and crack were not generated.

The optical waveguide obtained in Example 1 was evaluated for thermal resistance by the following three methods. In each evaluation, a film-shaped optical waveguide of 10 cm in length was used as the test sample.

[Thermal Cycle Test]

A temperature cycle test described in the JPCA Standard, 6.2.5 was performed. In this test, a temperature cycle consisting of decreasing temperature from room temperature (25° C.) to −40° C. over 50 minutes, holding 30 minutes, increasing temperature to 25° C. over 20 minutes, holding for 15 minutes, increasing temperature to 85° C. over 20 minutes, holding for 30 minutes, decreasing temperature to 25° C. over 20 minutes, and holding for 15 minutes was taken as 1 cycle, and 5 cycles were repeated. The difference in the insertion loss between before the test and after the test was measured. Also, the optical waveguide after the temperature cycle test was folded in a bend radius r=1 mm 100,000 times in the same manner as in Repeated Bending Test above, and the difference in the insertion loss between before and after the bending test was measured.

The insertion loss was measured by the measurement method of insertion loss described in the JPCA Standard, 4.6.1 (details are the same as in the above-described measurement of insertion loss).

The measurement results of the insertion loss were 3.0 dB before the temperature cycle test and 3.1 dB after the test. This is in the range of measurement error, and it can be said that the insertion loss was not changed between before and after the temperature cycle test.

Also, in the bending test after the temperature cycle test, the results were 3.1 dB before the test and 3.0 dB after the test, and it can be said that the insertion loss was not increased due to bending. After the bending test, breakage and crack were not generated.

[Thermal Resistance (High-Temperature Shelf Test)]

The thermal resistance was evaluated by performing a high-temperature shelf test described in the JPCA Standard, 6.2.1. When envisaging that the optical waveguide is soldered, it is preferred to be stable to heating at 200° C. or more.

In this test, the sample was introduced into an oven, the temperature was increased from room temperature to 260° C. over 2 hours and held at 260° C. for 10 minutes, thereafter, the system was left standing until the temperature naturally dropped to room temperature. The evaluation was performed by measuring the difference in insertion loss between before and after introduction into the oven. When this difference is 3 dB, preferably 2 dB or less, the thermal resistance is judged as good.

As a result, the insertion loss difference produced by heating was 1.7 dB. Also, after the completion of this test, the bending test in r=1 mm was performed 100,000 times, and the increase in insertion loss due to bending was measured and found to be 0.3 dB. After the bending, breakage and crack were not observed.

[Thermal Resistance (High-Temperature High-Humidity Shelf Test)]

The thermal resistance was evaluated by performing a high-temperature high-humidity shelf test described in the JPCA Standard, 6.2.3. As for the test conditions, "Test Condition 3" was employed. That is, in this test, after introduction into high-temperature high-humidity conditions of 85° C. and 85% RH for 300 hours, the system was left standing until the temperature naturally dropped to room temperature. The difference in insertion loss between before and after introduction into the high-temperature high-humidity conditions was measured. When this difference is 1 dB or less, the thermal resistance is judged as good.

As a result, the increase in insertion loss due to holding under high-temperature high-humidity conditions was 0.0 dB. Also, after the completion of this test, the bending test in r=1 mm was performed 100,000 times, and the increase in insertion loss due to bending was measured and found to be 0.1 dB. After the bending, breakage and crack were not observed.

As seen from the results in Tables 1 and 2, the optical waveguides of Examples 1 to 3 according to the present invention have good performance in terms of both the numerical aperture and the insertion loss. Also, the bending strength is good, and this reveals excellent contact between the core and the cladding. Furthermore, it is seen from the results of the thermal resistance tests that these optical waveguides are also excellent in the thermal resistance.

While the present invention has been described in detail and with reference to specific embodiments thereof, it will be apparent to one skilled in the art that various changes and modifications can be made therein without departing from the spirit and scope thereof.

This application is based on Japanese patent application No. 2009-066720 filed on Mar. 18, 2009, and the entire contents of which are incorporated hereinto by reference.

DESCRIPTION OF REFERENCE NUMERALS AND SIGNS

1 Core
1a Coating film
2 Lowercladding
3 Uppercladding

4 Cladding
5 Substrate

The invention claimed is:

1. An optical waveguide comprising:
   a core formed by curing (A) a fluorine-containing polyarylene prepolymer having a crosslinkable functional group; and
   a cladding formed by curing (I) a curable composition containing (B) a compound having a molecular weight of 140 to 5,000, having a crosslinkable functional group and having no fluorine atom, and (A) a fluorine-containing polyarylene prepolymer.

2. The optical waveguide according to claim 1, wherein in said curable composition (I), the ratio of said fluorine-containing polyarylene prepolymer (A) to the total mass of said fluorine-containing polyarylene prepolymer (A) and said compound (B) is from 1 to 97 mass %.

3. The optical waveguide according to claim 1, wherein said compound (B) has two or more of crosslinkable functional groups.

4. The optical waveguide according to claim 1, wherein the crosslinkable functional group in said compound (B) contains one or more members selected from the group consisting of a vinyl group, an allyl group, an ethynyl group, a vinyloxy group, an allyloxy group, an acryloyl group, an acryloyloxy group, a methacryloyl group and a methacryloyloxy group.

5. The optical waveguide according to claim 1, which is in a film form.

6. The optical waveguide according to claim 2, wherein said compound (B) has two or more of crosslinkable functional groups.

7. The optical waveguide according to claim 2, wherein the crosslinkable functional group in said compound (B) contains one or more members selected from the group consisting of a vinyl group, an allyl group, an ethynyl group, a vinyloxy group, an allyloxy group, an acryloyl group, an acryloyloxy group, a methacryloyl group and a methacryloyloxy group.

8. The optical waveguide according to claim 3, wherein the crosslinkable functional group in said compound (B) contains one or more members selected from the group consisting of a vinyl group, an allyl group, an ethynyl group, a vinyloxy group, an allyloxy group, an acryloyl group, an acryloyloxy group, a methacryloyl group and a methacryloyloxy group.

* * * * *